United States Patent
Bittnar et al.

(10) Patent No.: US 8,339,937 B2
(45) Date of Patent: Dec. 25, 2012

(54) COMMUNICATIONS NETWORK

(75) Inventors: Karl Bittnar, Neufinsing (DE);
Arno-Gert Fabritius, Germering (DE);
Viktor Karell, Rudelzhausen (DE);
Klaus Kirchberger, München (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 419 days.

(21) Appl. No.: 11/664,567

(22) PCT Filed: Aug. 18, 2005

(86) PCT No.: PCT/EP2005/008943
§ 371 (c)(1),
(2), (4) Date: Apr. 3, 2007

(87) PCT Pub. No.: WO2006/037400
PCT Pub. Date: Apr. 13, 2006

(65) Prior Publication Data
US 2008/0304478 A1    Dec. 11, 2008

(30) Foreign Application Priority Data

Oct. 5, 2004  (GB) .................................. 0422005.9

(51) Int. Cl.
*H04W 4/00* (2009.01)
*H04W 40/00* (2009.01)
*H04L 12/56* (2006.01)

(52) U.S. Cl. ........ 370/216; 370/338; 370/341; 370/401; 370/402; 370/389; 455/428

(58) Field of Classification Search ................. 370/402, 370/401, 352; 379/32.04
See application file for complete search history.

(56) References Cited

U.S. PATENT DOCUMENTS

| | | | | |
|---|---|---|---|---|
| 5,528,595 A * | 6/1996 | Walsh et al. | ................. | 370/402 |
| 5,559,800 A * | 9/1996 | Mousseau et al. | ............ | 370/401 |
| 6,424,700 B1 * | 7/2002 | Thibon et al. | ............. | 379/32.04 |
| 7,039,046 B1 * | 5/2006 | Simons et al. | ................ | 370/388 |
| 7,197,664 B2 * | 3/2007 | Khosravi | ......................... | 714/12 |
| 7,257,394 B2 * | 8/2007 | Kikuta et al. | ................. | 455/415 |
| 7,302,256 B1 * | 11/2007 | O'Hara et al. | ................ | 455/418 |
| 2003/0061319 A1 | 3/2003 | Manzardo | | |
| 2003/0152064 A1 * | 8/2003 | Khan et al. | .................... | 370/352 |

* cited by examiner

*Primary Examiner* — Nittaya Juntima
*Assistant Examiner* — Samina Choudhry

(57) ABSTRACT

A distributed Internet Protocol communications network comprises a central control system comprising control processing means and at least one access point remote from the central control system for providing access to the packet based communications network. Under normal operating conditions the at least one access point is controlled by the control processing means. The network also comprises an emergency processing distinct from the central control system for controlling the at least one access point when there is a failure in the control processing means control of the at least one access point.

15 Claims, 3 Drawing Sheets

COMMUNICATIONS NETWORK

CROSS REFERENCE TO RELATED APPLICATIONS

This application is the US National Stage of International Application No. PCT/EP2005/008943, filed Aug. 18, 2005 and claims the benefit thereof. The International Application claims the benefits of Great Britain application No. 0422005.9 GB filed Oct. 5, 2004, both of the applications are incorporated by reference herein in their entirety.

FIELD OF INVENTION

The present invention relates to a communications network.

BACKGROUND OF INVENTION

In the past, large companies having a corporate headquarters and multiple branch offices have tended to operate independent self-contained telecommunication systems at each of the branches and at the headquarters. Naturally, these independent systems would be networked together. The administrative effort and the costs involved in running such multiple independent systems was high.

More recently, by using Internet Protocol (IP) internetworking between the headquarters and the various branches, it has been possible to relocate parts of the headquarters central system into the branches, whilst retaining a single point of control at the headquarters.

SUMMARY OF INVENTION

Systems based on the HiPath 4000 IP Distributed Architecture, provided by Siemens AG, are examples of such IP internetworked systems. An example of a HiPath 4000 IP Distributed Architecture system is shown schematically in FIG. 1.

Telecommunication system 1 comprises a first Local Area Network (LAN) 2 located at a company's headquarters, a second LAN 3 located at a first branch office (not shown), a third LAN 4 located at a second branch office (not shown) and a fourth LAN 5 located at a third branch office (not shown). The first LAN 2 is connected to a first router 6, the second LAN 3 to a second router 7, the third LAN 4 to a third router 8 and the fourth LAN 5 to a fourth router 9. These routers connect the LANs via a Wide Area Network (WAN) 10.

A first access point 11 connects to the first Lan 2, a second access point 12 connects to the second LAN 3, a third access point 13 connects to the third LAN 4 and fourth 14 and fifth 15 access points connect to the fourth LAN 5. These access points 11 to 15 allow the connection of client terminals (not shown) to the LANs 2 to 5 and hence to the WAN 10. In a typical HiPath 4000 system the client terminals may either be traditional Time Division Multiplexed (TDM) devices, for example standard telephones or cordless telephones, or IP devices, for example IP telephones.

A central control system 16 connects to the first LAN 2 at the headquarters (not shown) and is responsible for controlling the operation of each of the access points 11 to 15.

Each of the access points 11 to 15 comprises a respective gateway card 11a to 15a and a plurality of peripheral cards 11b to 15b. The peripheral cards 11b to 15b provide multiple peripheral ports for connection to client terminals, for example phones and/or trunk lines. The gateway cards 11a to 15a are the controllers of the IP based Access Point. Each of the cards 11a to 15a acts as a gateway between the LAN on one side of the card, and the client terminals on the other side of the card, converting payload data (e.g. voice data, fax data and ISDN-data) from TDM data to IP data and vice versa. Each of the cards 11a to 15a provides a local TDM switching matrix, conference units and tone generators. Each of the gateway cards 11a to 15a may be Siemens' HG 3575 cards.

The central control system 16 comprises a plurality of gateway cards 16a, a plurality of peripheral cards 16b, an administration and data processor 16c, a common control processor 16d and a back up common control processor 16e.

Again, the plurality of peripheral cards 16b provide multiple peripheral ports for connection to client terminals, for example phones and/or trunk lines. The gateways 16a translate payload data (voice/fax/ISDN-data) from TDM data on the client terminal side of the gateways to IP data on the LAN side of the gateways and vice versa. These gateways are used for connections between the IP based access points 11 to 15 and the central system 16. These cards 16a may be Siemens' HG 3570 cards.

The Administration and Data Processor 16c runs administrative software and applications, whilst the common control processor 16d runs call processing software. The back up common control processor 16e provides a back up to the common control processor 16d and in the event of the failure of the common control processor 16d, it can be switched into use without interrupting active calls.

The access points are controlled by the common control processor 16d. Every activity of the peripheral cards, for example, tones or displays at the phones and signaling messages at trunk interfaces are controlled by the common control processor 16d via a control link over the IP network. A complete set of administrative parameters in a database (not shown) in the central system 16 is kept in the memory of the control processor 16d. A persistent copy of the database is kept on hard disc which is controlled by the administration and data processor 16c.

Such systems have reduced administrative outlay but an increased dependence on the availability of the network and of the central system. If the central control fails, no further telecommunication is possible—in the corporate HQ or in the branches. A very high availability of the central control is achieved by duplicating the control processors.

As illustrated in FIG. 2, in order to maintain control of access points upon failure of the WAN 10, a modem connection may be established between the central system 16 and some or all of the access points. In FIG. 2, a connection between the central system 16 and the third access point 13, the fourth access point 14 and the fifth access point 15 is made through the Public Switched Telephone Network (PSTN) 17 via a router 18 connected to the LAN 2 and a first modem 19 connected to the gateway 13a, a second modem 20 connected to the gateway 14a and a third modem 21 connected to the gateway 15a. Access points without modem connections, in this example, the second access point 12, go out of service when their WAN connections fail. However, even back up systems such as this are useless in the event of total failure of the central system brought on by a catastrophe such as flooding or destruction of the building.

Embodiments of the present invention aim to alleviate the above described problems.

According to the present invention there is provided a distributed packet based communications network comprising: a central control system comprising control processing means; at least one access point remote from the central control system, the at least one access point for providing access to the packet based communications network, wherein under normal operating conditions the at least one access point is controlled by the control processing means; and emergency processing means distinct from the central control, system for controlling the at least one access point when there is a failure in the control processing means control of the at least one access point.

BRIEF DESCRIPTION OF THE DRAWINGS

The above and further features of the invention are set forth in the claims and together with advantages thereof will become clearer from consideration of the following detailed description of an exemplary embodiment of the invention given with reference to the accompanying drawings, in which:

DETAILED DESCRIPTION OF INVENTION

Figure 1:
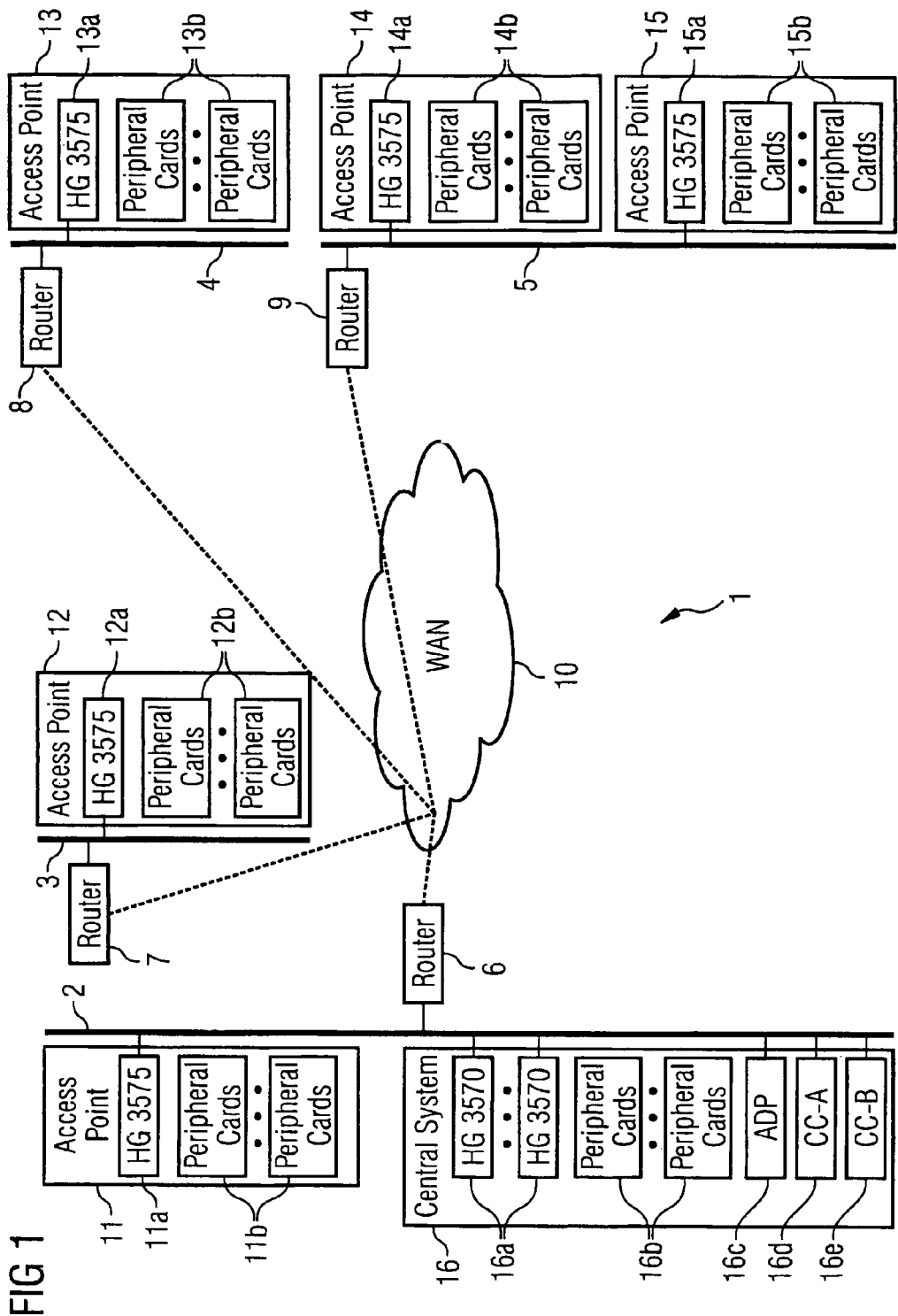
FIG. 1 illustrates a communication system and has already been described.
Figure 2:
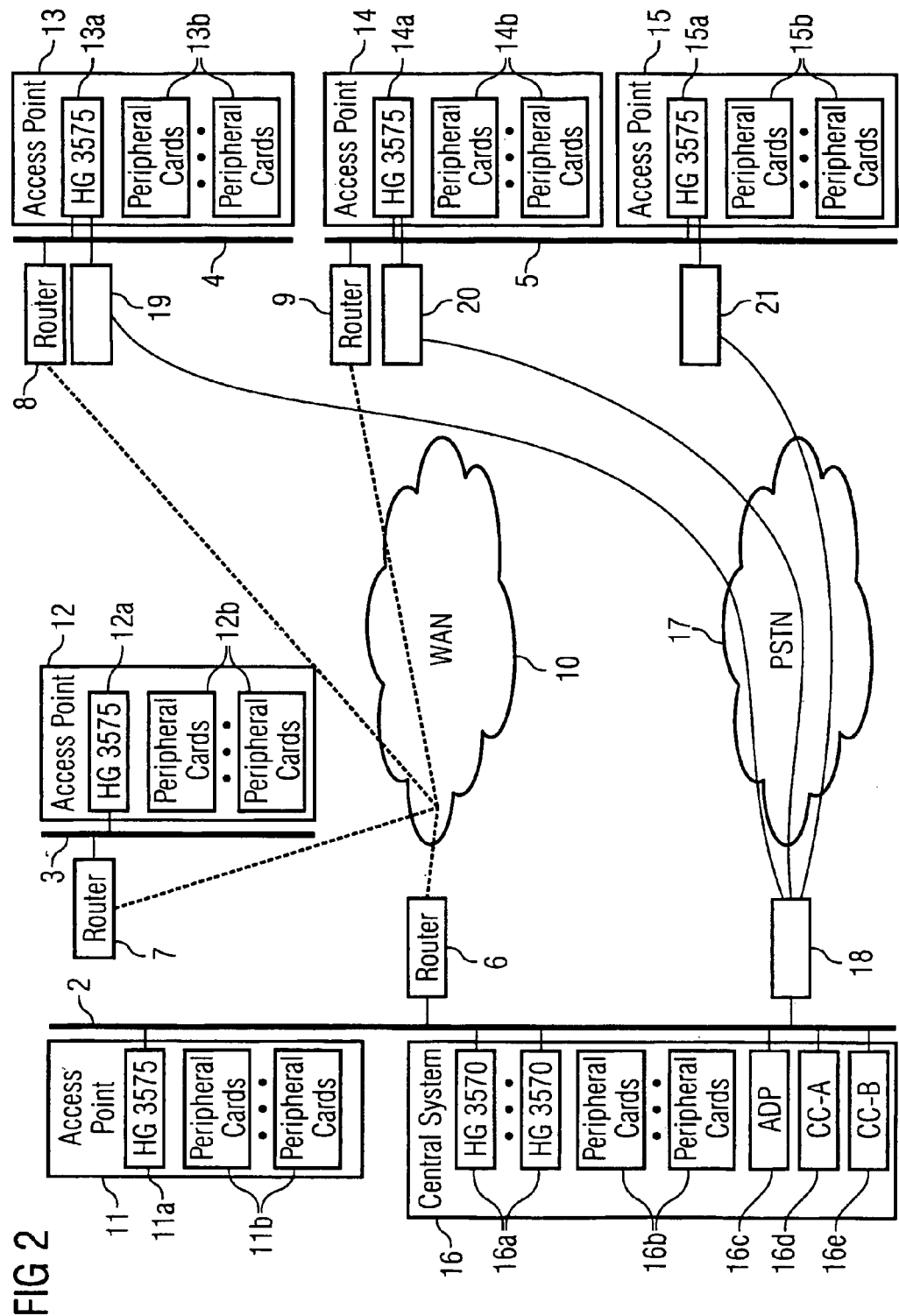
FIG. 2 illustrates a communication system and has already been described.
Figure 3:
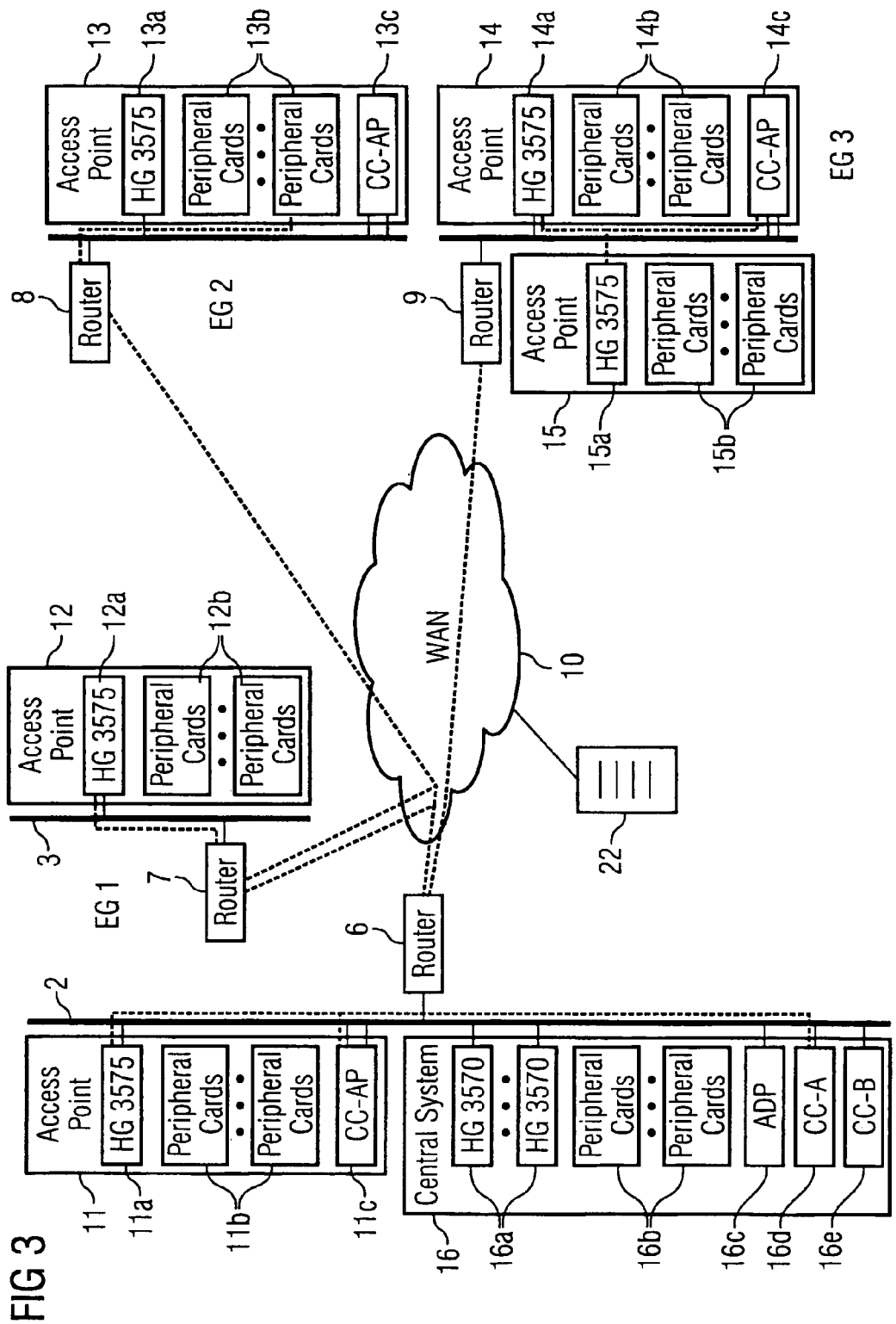
FIG. 3 illustrates a communications system embodying the present invention.

Referring now to FIG. 3 of the drawings, in which identical features as those illustrated in FIG. 1 are given like reference numerals, a communications system 100 embodies the present invention.

Under normal operating conditions the communications system 100 functions identically to the system 1 illustrated in FIG. 1. That is to say, the four access points 11 to 15 are all operated under the central control of the central system 16.

The system 100 is provided with an emergency de-centralised control system for controlling access points in the event of the failure of the IP network linking access points and the central system 16 or if the central system 16 is not actually available. To this end, the first access point 11, the third access point 13 and the fourth access point 14 are provided with their own emergency control processors labelled 11c, 13c and 14c respectively.

Each of the emergency control processors 11c, 13c and 14c offer the same functionality as the central control.

They possess the same software, the same patch status (i.e. software corrections applied to the system while running) and identical configuration data as do the administration and data processor 16c and the common control processor 16d of the central system 16. Groups of access points are assigned to emergency control groups, each emergency control group comprising one of the emergency control processors 11c, 13c and 14c. In the system 100, the first access point 11 and the second access point 12 makeup a first emergency control group, the third access point 13 makes up a second emergency control group and, the fourth access point 14 and fifth access point 15 make up a third emergency control group. Each of the emergency control processors 11c, 13c and 14c is in contact with the gateway cards in its respective emergency group. Thus, if an access point of an emergency group loses contact with the central system the emergency processor of that group may take control of the access point.

A mechanism is provided for keeping the software status and the configuration data of the emergency control processors identical to that of the central system 16.

A backup server 22 is connected to the WAN 10, and in order to save on transmission bandwidth the software the software and database of the central system 16 is transmitted periodically, for example each day, to the backup server 22. This backup server 22 is as a general rule a separate device from the central system 16 and the emergency control processors 11c, 13c and 14c. The central system 16 and all the emergency control processors 11c, 13c and 14c have access via the IP network 10 to the backup server 22. The emergency control processors 11c, 13c and 14c check cyclically whether updated data is present on the server 22 and download it where necessary. Thus each emergency control processor maintains an identical database to that at the central control. In an emergency the emergency control processors 11c, 13c and 14c can thus behave in exactly the same way as the central system processors.

A fault occurs when an access point can no longer be served by the central control 16. If an access point gateway card detects a problem with the signalling connection between the access point of that card and the central system 16, it reports that fact to the emergency processor of the emergency group to which the access point belongs. The emergency processor decides according to preconfigured rules whether to take over control of the access point or not. In one embodiment, each access point in an emergency group is assigned a weight value of between zero and one, and when the total weight value of all access points in the emergency group that have lost connection with the central system 16 equals or exceeds a predefined threshold, the emergency processor of the group takes over control of those access points. So for example, in an emergency group comprising three access points each having a weight value of 0.5 and wherein the threshold is 1, it is only when at least two access points have reported a central system connection failure that the emergency processor steps in and assumes control of those access points. Naturally, an individual access point of particular importance, for example an access point serving the telephones of senior managers, may be assigned a weight value equal to the threshold value so that if this access point loses connection with the central system, an emergency processor immediately assumes control of it.

In alternative embodiment, the access points in an emergency group may be configured to be taken over individually by the group's emergency processor as and when an access point loses contact with the central system 16.

Naturally, the access points may be configured so that an immediate hand over to an emergency processor may be ordered by the system administrator.

In a preferred embodiment, to take over control of an access point, the emergency processor instructs the gateway card of the access point to restart and to start up with the emergency processor.

If the central system 16 succeeds in re-establishing a control connection to an Access Point in emergency operation, the access point remains under the control of the emergency processor but notifies it that it has re-established contact with the central system 16. The emergency processor decides in accordance with pre-defined rules whether and when emergency operation can be ended.

For example, emergency control may be ended only if every access point in an emergency group has had a stable connection with the central system 16 for a configurable pre-determined time period. Emergency control may only be ended at configurable pre-defined times of the day. The system may be configured so that a system administrator may order the end of emergency control.

To end emergency control of an access point, the emergency control processor instructs the gateway card of the access point to do a restart and to start up under the control of the central system 16.

Having thus described the present invention by reference to preferred embodiments it is to be well understood that the embodiments in question are exemplary only and that modifications and variations such as will occur to those possessed of appropriate knowledge and skills may be made without departure from the scope of the invention as set forth in the claims.

The invention claimed is:

1. A distributed packet based communications network, comprising:
   a central control system comprising a central controller;
   an access point remote from the central control system, the access point provides access to the packet based communications network, wherein under normal operating conditions the access point is controlled by the central controller, the access point comprising a gateway card and an emergency controller distinct from the central control system and the central controller of the central control system, the emergency controller configured to control the access point when there is a failure in the control of the access point that results when there is a failure in communication between the central controller of the central control system and the access point; and
   a plurality of other access points controlled by the central controller, the other access points and the access point forming a group of access points, wherein the emergency controller controls any of the other access points in the group when there is a failure in the control exerted by the central controller of any of those access points in the group that results at least in part due to a failure in communication between the central controller of the central control system and any of those access points of the group; and
   wherein the emergency controller is periodically updated to include data used by the central controller to control the access point; and
   the gateway card detecting the failure in communication between the central controller of the central control system and the access point and reporting the detected failure to the emergency controller; and
   wherein in response to the reporting of the detected failure, the emergency controller instructs the gateway card of the access point to restart so that after restarting the gateway card is controlled by the emergency controller, the emergency controller controlling the restarted gateway card using the updated data.

2. The system of claim 1 further comprising a server to which data from the central control system is uploaded for downloading to the emergency controller.

3. The system of claim 2 wherein the server is distinctly separate from the central control system and the access point.

4. The system of claim 3 wherein the data is uploaded periodically.

5. The system of claim 1 wherein prior to instructing the gateway card to restart, the emergency controller determines whether to take control of the access point based upon predetermined rules.

6. The system of claim 1 wherein the access point provides Time Division Multiplexed user terminals access to the packet based communications network.

7. The system of claim 1 comprising a plurality of groups of access points, each group having an access point comprising an emergency controller for controlling any access points in that group when there is a failure in the control exerted by the central controller of one or more access points in that group.

8. The system of claim 1 comprising a plurality of other groups of access points that each have an access point comprising an emergency controller for controlling any access points in that group when there is a failure in the control exerted by the central controller of one or more access points in that group.

9. An emergency controller of an access point in a packet based communication network, the emergency controller comprising:
   a non-transitory memory having software for controlling the access point when a failure occurs such that a central controller distinct from the emergency controller that controls the access point under a normal operating condition cannot control at least a portion of the access point that the central controller is configured to control under the normal operating condition, the failure occurring at least in part due to a communication failure between the central controller and the access point, the central controller being remote from the access point, the access point providing user terminals with access to the packet based communication network;
   data having control information to be used by the software in order to control the access point; and
   a failure indicator that indicates if the failure occurs; and
   wherein the software is configured to use the data to control the access point if the failure indicator indicates that the failure occurred; and
   wherein the emergency controller obtaining updates to the data from a server remote from the emergency controller and remote from the access point; and
   wherein in response to receipt of a report of the failure from a gateway card of the access point that detects the failure, the emergency controller instructing the gateway card of the access point to restart so that after restarting the gateway card is controlled by the emergency controller, the emergency controller controlling the restarted gateway card using the updated data obtained from the server; and
   wherein the access point of the emergency controller and a plurality of other access points form a group of access points and the emergency controller controls any access point in the group experiencing a failure in the control exerted by the central controller of those access points in the group that results at least in part due to a failure in communication between the central controller and any of those access points of the group that experience the failure in control.

10. The emergency controller of claim 9 further comprising a restore indicator that indicates that control of the access point is to be restored to the central controller.

11. The emergency controller of claim 10 wherein the emergency controller is configured to poll the server for the update of the data, the update of the data being included in an update to the software.

12. An access point for providing access to a packet based communication network, comprising:
   an emergency controller comprised of software configured to control an access point when a failure occurs such that a central controller that controls the access point under a normal operation cannot control at least a portion of the access point that the central controller is configured to control under the normal operating condition due at least in part to a communication failure between the access point and the central controller, the central controller being distinct from the emergency controller and remote from the access point;
   a gateway card communicatively connected to the emergency controller;

the emergency controller also having data, the data having control information to be used by the software in order to control the access point;

a first interface connected to the emergency controller, the first interface configured to connect to a server that is distinct from the access point and from the central controller; and a second interface connected to the emergency controller, the second interface configured to connect to at least one terminal device;

the emergency controller using the first interface to cyclically poll the server for an update to the data; and the gateway card detecting the communication failure between the central controller and the access point and reporting the detected communication failure to the emergency controller; and in response to receiving the reporting of the detected communication failure from the gateway card, the emergency controller instructing the gateway card to restart so that after restarting the gateway card is controlled by the emergency controller and is no longer controlled by the central controller; and wherein the access point and a plurality of other access points form a group of access points and the emergency controller controls any access point in the group experiencing a failure in the control exerted by the central controller of those access points in the group that results at least in part due to a failure in communication between the central controller and any of those access points of the group that experience the failure in control.

13. The access point of claim 12 further comprising wherein in response to detecting a recovery after the failure occurs, the emergency controller instructs the gateway card to restart so the gateway card is controlled by the central controller and is no longer controlled by the emergency controller.

14. The access point of claim 12 wherein in addition to detecting the communication failure, a criterion must be met in order for the emergency controller to instruct the gateway card to restart so that after restarting the gateway card is controlled by the emergency controller, the gateway card performing the restarting by starting up with the emergency controller.

15. The access point of claim 14 wherein the second interface is comprised of the gateway card.

* * * * *